(12) United States Patent
Viraraghavan et al.

(10) Patent No.: US 11,645,013 B2
(45) Date of Patent: May 9, 2023

(54) MANAGING DISPERSED STORAGE NETWORK BACKGROUND TASKS

(71) Applicant: INTERNATIONAL BUSINESS MACHINES CORPORATION, Armonk, NY (US)

(72) Inventors: Praveen Viraraghavan, Chicago, IL (US); Adam Gray, Chicago, IL (US); Tyler Kenneth Reid, Hanover Park, IL (US); Peter Kim, Arlington Heights, IL (US); Fnu Manupriya, Skokie, IL (US); Anuraag Shah, Chicago, IL (US); Sridhar Gopalam, Buffalo Grove, IL (US); David Brittain Bolen, Chicago, IL (US); Bruno Cabral, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 595 days.

(21) Appl. No.: 16/694,315

(22) Filed: Nov. 25, 2019

(65) Prior Publication Data
US 2021/0157484 A1    May 27, 2021

(51) Int. Cl.
*G06F 9/455*    (2018.01)
*G06F 3/06*    (2006.01)
(Continued)

(52) U.S. Cl.
CPC ............ *G06F 3/067* (2013.01); *G06F 3/0607* (2013.01); *G06F 3/0644* (2013.01);
(Continued)

(58) Field of Classification Search
CPC ...... G06F 3/0652; G06F 3/0607; G06F 3/061; G06F 3/0644; G06F 3/0647;
(Continued)

(56) References Cited

U.S. PATENT DOCUMENTS

| | | | |
|---|---|---|---|
| 5,495,572 A | * | 2/1996 | Tanaka ................ G06F 11/1084 714/25 |
| 7,546,427 B2 | | 6/2009 | Gladwin et al. |

(Continued)

FOREIGN PATENT DOCUMENTS

WO    2010085256 A1    7/2010

OTHER PUBLICATIONS

Shin et al., "Task scheduling algorithm using minimized duplications in homogeneous systems", http://isiarticles.com/bundles/Article/pre/pdf/79240.pdf, 2008 Elsevier Inc., Apr. 8, 2008, 3 pages.

(Continued)

*Primary Examiner* — Emerson C Puente
*Assistant Examiner* — Zhi Chen
(74) *Attorney, Agent, or Firm* — Randy Tejeda; Andrew D. Wright; Calderon, Safran & Cole, P.C.

(57) ABSTRACT

Systems and methods for managing conflicting background tasks in a dispersed storage network are provided. In embodiments, a method includes: gathering scheduled future task data for scheduled future tasks from a plurality of task scheduling modules within a dispersed storage network, wherein the scheduled future tasks are tasks associated with stored data objects; monitoring the scheduled future task data for scheduling conflicts based on stored rules; determining that a scheduling conflict exists between a first future task of the scheduled future tasks and a second future task of the scheduled future tasks; issuing instructions to at least one of the plurality of task scheduling modules to update the first future task or the second future task based on the scheduling conflict; and updating, by the at least one of the plurality of task scheduling modules, the first future task or the second future task based on the instructions.

17 Claims, 5 Drawing Sheets

(51) Int. Cl.
  *G06F 9/38* (2018.01)
  *G06F 9/52* (2006.01)
(52) U.S. Cl.
  CPC .......... *G06F 3/0652* (2013.01); *G06F 3/0653* (2013.01); *G06F 9/3836* (2013.01); *G06F 9/3842* (2013.01); *G06F 9/52* (2013.01)
(58) Field of Classification Search
  CPC ...... G06F 3/0653; G06F 3/0659; G06F 3/067; G06F 3/0685; G06F 9/52; G06F 9/4881; G06F 9/3842; G06F 9/3836
  See application file for complete search history.

(56) References Cited

U.S. PATENT DOCUMENTS

| | | | |
|---|---|---|---|
| 8,019,728 B2 | 9/2011 | Bachwani et al. | |
| 8,266,413 B2 | 9/2012 | Hwu et al. | |
| 8,799,613 B2* | 8/2014 | Kottomtharayil | G06F 3/0631 |
| | | | 711/170 |
| 8,874,643 B2* | 10/2014 | Dean | H04L 67/42 |
| | | | 709/226 |
| 9,052,942 B1 | 6/2015 | Barber et al. | |
| 9,280,571 B2 | 3/2016 | Daga et al. | |
| 9,442,760 B2 | 9/2016 | Boutin et al. | |
| 9,928,249 B2 | 3/2018 | Lewis et al. | |
| 10,095,623 B2 | 10/2018 | Kluchnikov et al. | |
| 2002/0083081 A1* | 6/2002 | Chen | G06F 16/162 |
| 2006/0146589 A1* | 7/2006 | Karlsson | G11C 11/22 |
| | | | 365/145 |
| 2008/0028183 A1 | 1/2008 | Hwu et al. | |
| 2008/0082389 A1* | 4/2008 | Gura | G06Q 10/06 |
| | | | 705/7.13 |
| 2009/0055681 A1* | 2/2009 | Dholakia | G06F 11/1076 |
| | | | 714/6.13 |
| 2011/0225209 A1* | 9/2011 | Volvovski | G06F 16/162 |
| | | | 707/812 |
| 2014/0331086 A1* | 11/2014 | Resch | G06F 11/1458 |
| | | | 714/15 |
| 2014/0365598 A1* | 12/2014 | Torpey | G06F 3/0676 |
| | | | 709/213 |
| 2016/0255150 A1* | 9/2016 | Dhuse | G06F 3/067 |
| | | | 709/213 |
| 2017/0031627 A1* | 2/2017 | Kazi | H04L 63/108 |
| 2017/0052728 A1* | 2/2017 | Resch | H03M 13/1515 |
| 2018/0018231 A1* | 1/2018 | Okada | G06F 11/1076 |
| 2018/0039931 A1* | 2/2018 | Dotson | H04L 67/10 |
| 2018/0365105 A1* | 12/2018 | Volvovski | G06F 3/067 |
| 2019/0014059 A1* | 1/2019 | Hu | H04L 67/10 |
| 2019/0250990 A1* | 8/2019 | Gladwin | G06F 11/1076 |
| 2020/0097370 A1* | 3/2020 | Srinivasan | G06F 11/1464 |

OTHER PUBLICATIONS

Mell et al., "The NIST Definition of Cloud Computing", NIST, Special Publication 800-145, Sep. 2011, 7 pages.

* cited by examiner

MANAGING DISPERSED STORAGE NETWORK BACKGROUND TASKS

BACKGROUND

Aspects of the present invention relate generally to dispersed storage network and, more particularly, to managing conflicting background tasks in a managed dispersed storage network.

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure. A computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Apache Hadoop™ developed by Apache Software Foundation is a collection of open-source software utilities that supports distributed applications enabling application execution by thousands of computers.

In addition to cloud computing, a computer may use "cloud storage" as part of its memory system. Cloud storage enables a user, via its computer, to store files, applications, etc., on an Internet-accessed storage system. The Internet-accessed storage system may include a Redundant Array of Independent Disks (RAID) system and/or a dispersed storage system that uses an error correction scheme to encode data for storage.

SUMMARY

In a first aspect of the invention, there is a computer-implemented method including gathering, by a computing device, scheduled future task data for scheduled future tasks from a plurality of task scheduling modules within a dispersed storage network, wherein the scheduled future tasks are tasks associated with stored data objects; monitoring, by the computing device, the scheduled future task data for scheduling conflicts based on stored rules; determining, by the computing device and based on the monitoring, that a scheduling conflict exists between a first future task of the scheduled future tasks and a second future task of the scheduled future tasks; issuing instructions, by the computing device, to at least one of the plurality of task scheduling modules to update the first future task or the second future task based on the scheduling conflict; and updating, by the at least one of the plurality of task scheduling modules, the first future task or the second future task based on the instructions.

In another aspect of the invention, there is a computer program product including a computer readable storage medium having program instructions embodied therewith. The program instructions are executable by a computing device to cause the computing device to: gather scheduled future task data for scheduled future tasks from a plurality of task scheduling modules in a dispersed storage network, wherein the scheduled future tasks are tasks associated with stored data objects in the dispersed storage network; monitor the scheduled future tasks for scheduling conflicts; determine, based on the monitoring, a scheduling conflict exists between a first future task and a second future task of the scheduled future tasks; and issue instructions to at least one of the plurality of task scheduling modules to update the first future task or the second future task based on the scheduling conflict.

In another aspect of the invention, there is system including a processor, a computer readable memory, and a computer readable storage medium. The system includes program instructions to monitor scheduled future task data for scheduled future tasks within a dispersed storage network for conflicts based on stored rules, wherein the scheduled future tasks are tasks associated with stored data objects; program instructions to determine, based on the monitoring, that a conflict exists with respect to a first future task of the scheduled future tasks based on the stored rules; and program instructions to issue instructions to a task scheduling module of the dispersed storage network to update the first future task based on the scheduling conflict. The program instructions are stored on the computer readable storage medium for execution by the processor via the computer readable memory.

BRIEF DESCRIPTION OF THE DRAWINGS

Aspects of the present invention is described in the detailed description which follows, in reference to the noted plurality of drawings by way of non-limiting examples of exemplary embodiments of the present invention.

DETAILED DESCRIPTION

Figure 1:
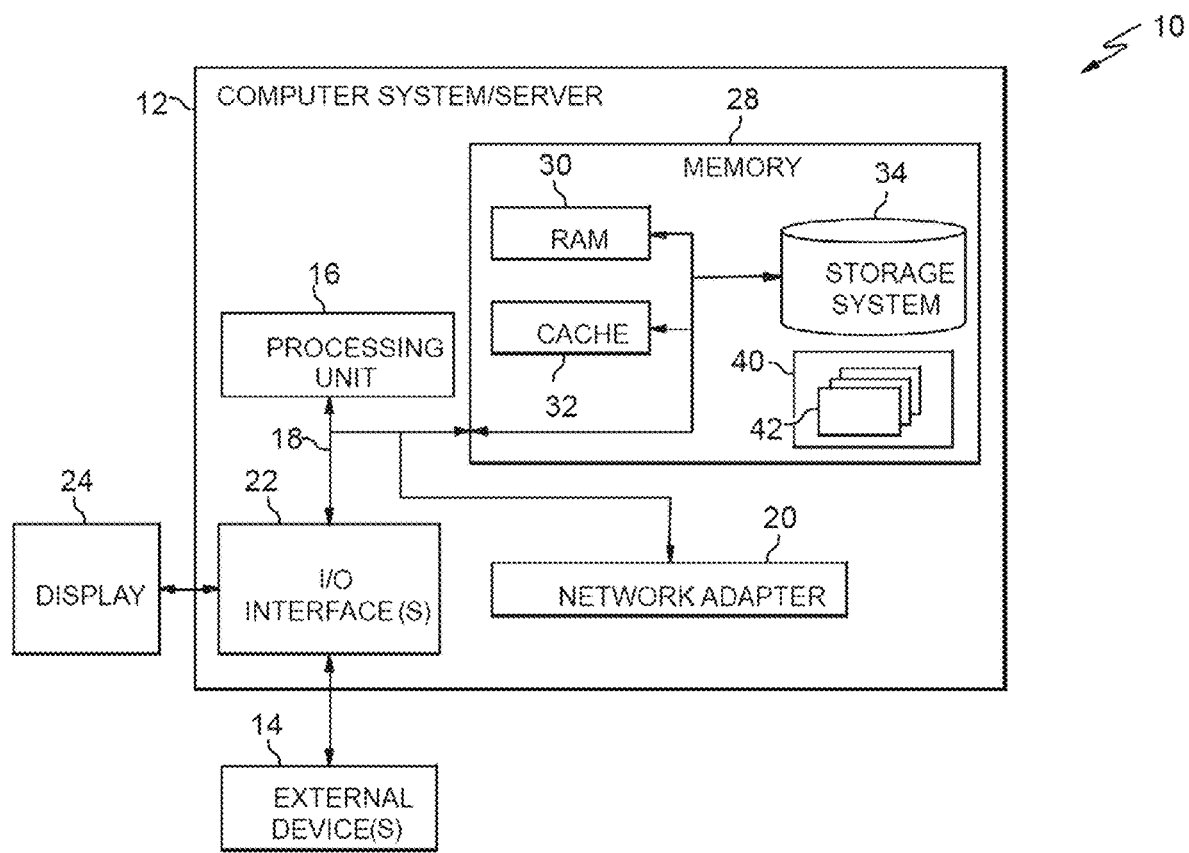
FIG. 1 depicts a cloud computing node according to an embodiment of the present invention.

Aspects of the present invention relate generally to dispersed storage networks and, more particularly, to managing conflicting background tasks in a dispersed storage network. In embodiments, a method is provided for intelligently rebuilding a dispersed storage network (DSN) using data transition prediction, the method including: monitoring tasks within the DSN to be performed in the future; detecting if a conflict between future tasks exists; and, if a conflict exists, optimizing the future tasks by at least one of: dropping a task in favor of another task(s); ordering the task in a way that minimizes the number of disk operations to be performed, and assigning priority to non-tiered and non-expired repair data objects.

In a DSN, there are often multiple modules concurrently scheduling background tasks which interact with stored data objects. Each added task adds extra burden on the components of a digital data store such as a CPU, network and memory device of the digital data store, which may contribute to a suboptimal end user experience. When a module schedules future tasks targeted to data objects independently of other modules, unwanted tasks are introduced. For example, if a module A schedules a data object to be deleted as part of object expiration and a module B, having no knowledge of module A, schedules the same object to be scanned and repaired, the scanning and repairing is an unnecessary task since the data object will be deleted. Ideally, the module B would not schedule its task knowing that the object would be expired on a upcoming date.

In some cases, original data files to be stored in a DSN are dispersed into a number of file "slices" or subsets in such a manner that the data in each file share is less usable or less recognizable or completely unusable or completely unrecognizable by itself except when combined with some or all of the other file shares. These file shares are stored on separate digital data storage devices (e.g., as a way of increasing privacy and security). As dispersed file shares are being transferred to or stored on a grid of distributed storage locations, various grid resources may become non-operational or perform sub-optimally. When portions of a dispersed file share are missing or unavailable, a rebuilder may rebuild or repair the dispersed file share.

Another example of a background task that might influence the scheduling of rebuilding tasks is storage class tiering of data objects to another storage medium such as a storage pool of solid state drives (SSDs) or hard drives. Suppose that a data object is missing a data slice(s) and needs to be rebuilt to full width, a rebuilder module may choose to skip the object because it would eventually be moved to a physically different tier of storage and its health would be restored in the process of re-writing the object to the new tier. The rebuilding task in this case would end up being redundant work. The omission of such tasks in cases where the object is bound to be tiered or expired reduces CPU workload, network traffic across dispersed storage units, and disk read and write operations which have significant impact on the end user experience.

In cloud object storage (COS) systems, there are often times when an operator or a user desires to know the quality and quantity of data on the system and use this information to be data aware and cost prepared. COS systems may schedule scanning and reclamation together, thereby reclaiming objects that are supposed to expire today and scanning objects that will expire tomorrow. Such systems do not differentiate between objects that are supposed to expire today versus objects that will expire 10 days from today (a delay which would provide enough time to schedule another agent to get a storage footprint). The ability to provide insights such as availability X bytes in Y days on a resource is valuable to any cloud operator or user.

For an operator of a COS system, if a region/site exists which has data object expiration enabled, an operator may wish to auto scale the system based on the rate at which objects are expiring versus the rate at which data objects are ingested. In another example, an operator may wish to allow auto provisioning of new resources based on the growth rate of the data while accounting for disk space that will be available post-reclamation. Scanning a whole region/site may have additional cost and performance implications on the COS system, such that it may be undesirable to include such functions in the expiration producer consumer framework but instead run such functions as an independent or on-demand agent (software module) crawling through the index. Such an agent/module could be scheduled to run on a per site, per region and per container basis. Furthermore, such an agent/module may also be extended to detect capacity utilization when objects are tiered to different storage classes, allowing for operations teams to better provision the system. For example, there is no need to provision if space will become free when a data object is going to be moved to a new tier of a data storage device.

Advantageously, embodiments of the invention provide an improved data storage system that reduces unnecessary tasks, thus reducing consumption of computer resources. In implementations, when there are conflicting future tasks to be executed, several actions can be taken by a system of the invention including: a) one task can be dropped in favor of another; b) tasks can be ordered in a way that minimizes the number of disk operations; or c) priority can be given to objects that need repair that are not going to be tiered or expired. Moreover, embodiments of the present invention provide an improved method for rebuilding objects using data transition prediction which provides a technical solution to the technical problem of conflicting scheduled tasks within a DSN.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
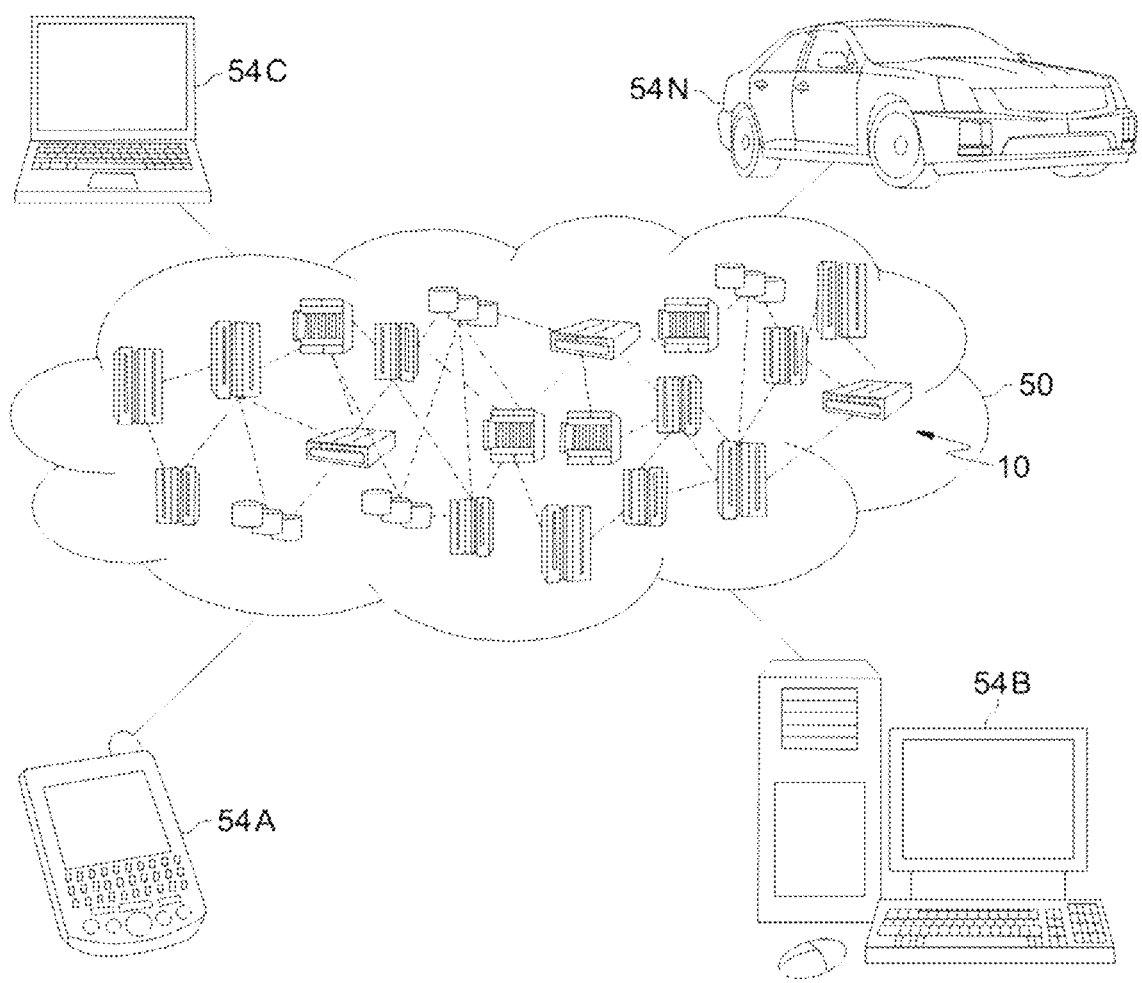
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
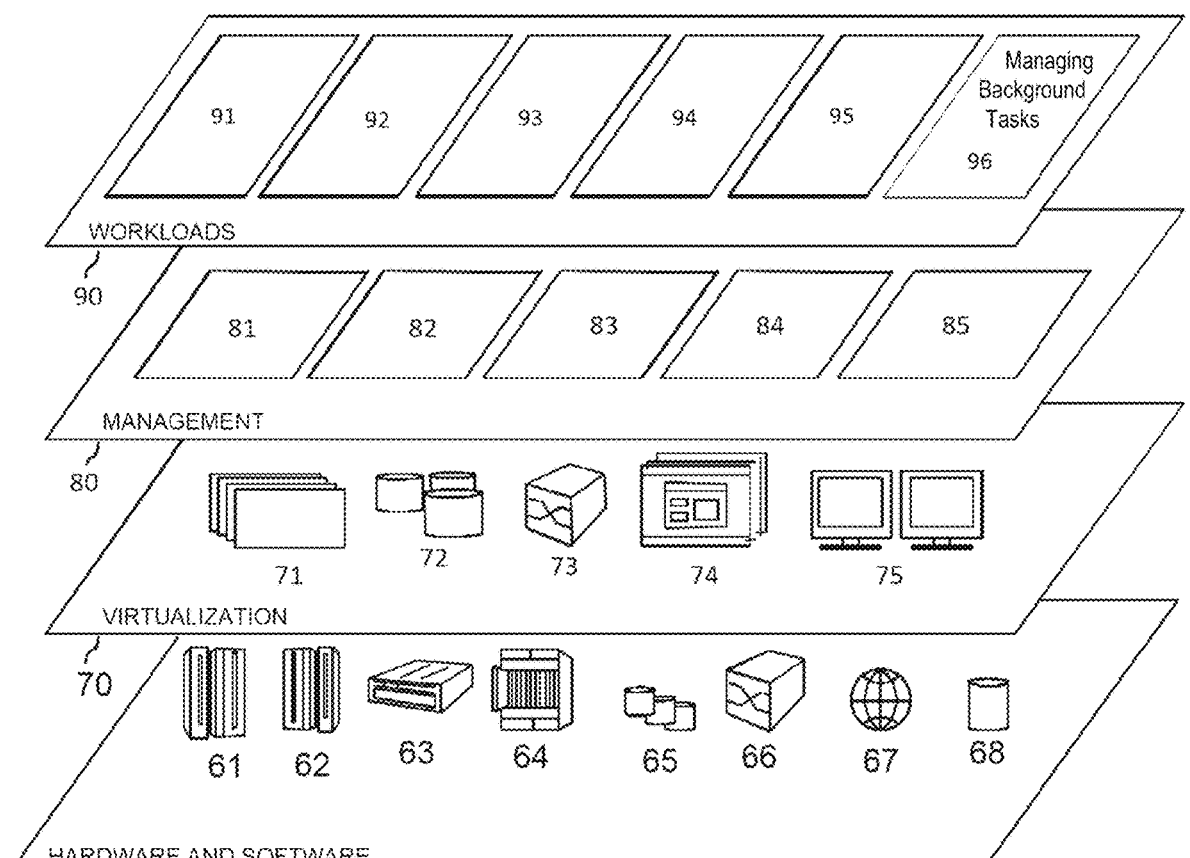
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and managing background tasks 96.

Implementations of the invention may include a computer system/server 12 of FIG. 1 in which one or more of the program modules 42 are configured to perform (or cause the computer system/server 12 to perform) one of more functions of the managing background tasks 96 of FIG. 3. For example, the one or more of the program modules 42 may be configured to: receive future task data from a plurality of task scheduling modules in a distributed storage network (DSN); monitor the scheduled future task data for conflicting tasks; determine a scheduling conflict between scheduled future tasks based on the future task data; and generate and send instructions to one or more of the plurality of task scheduling modules to update task schedules base on the scheduling conflict, wherein the instructions cause the one or more of the plurality of task scheduling modules to update their task schedules to resolve the scheduling conflict.

Figure 4:
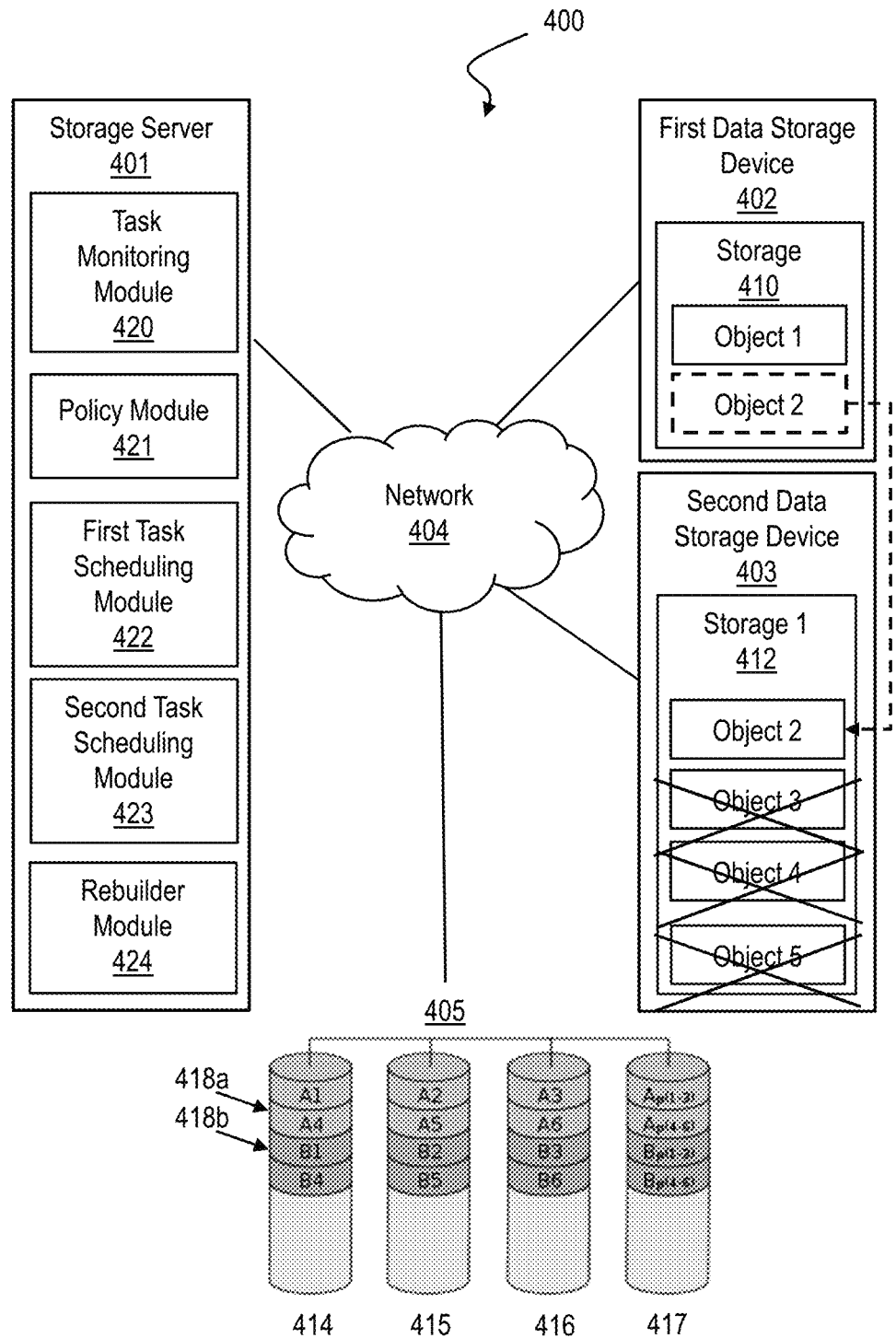
FIG. 4 shows a block diagram of an exemplary environment in accordance with aspects of the invention.

FIG. 4 shows a block diagram of an exemplary DSN 400 in accordance with aspects of the invention. In embodiments, the DSN 400 includes a storage server 401 in communication with multiple data storage devices represented by the first data storage device 402, the second data storage device 403, and a redundant array of independent disks (RAID) 405, via the network 404. In embodiments, the DNS 400 comprises a cloud storage system in which digital data is stored in logical pools. In implementations, physical storage within the DSN 400 spans multiple servers.

The network 404 may be any suitable communication network or combination of networks, such as a local area network (LAN), a general wide area network (WAN), and/or a public network (e.g., the Internet). In aspects, the storage server 401 is in the form of the computing device 12 of FIG. 1 and comprises a special purpose computing device that is part of a DSN infrastructure. In embodiments, the first data storage device 402, the second data storage device 403 and the RAID 405 each include components of the computing device 12 of FIG. 1. In aspects, cloud storage services of the first data storage device 402, second data storage device 403 and/or the RAID 405 are accessed by the storage server 401 through a web service application programming interface (API) or by applications that utilize the API.

In implementations, the first data storage device 402 includes a digital data storage 410 configured to store a plurality of data objects, such as Object 1 and Object 2. In embodiments, the second data storage device 403 includes a digital data storage 412 configured to store a plurality of objects, which are represented by Objects 2-5. In aspects, the RAID 405 includes a plurality of disks 414-417 for storing data objects, each including a plurality of storage tiers represented at 418a and 418b. In embodiments, original data files to be stored in the DSN 400 are dispersed into a number of file "slices" or subsets in such a manner that the data in each file share is less usable or less recognizable or completely unusable or completely unrecognizable by itself except when combined with some or all of the other file shares. In such cases, the slices may be dispersed within a single data storage device (e.g., RAID 405) or within a plurality of data storage devices (e.g., the first data storage device 402 and the second data storage device 403). One of ordinary skill in the art would understand that a variety of data storage devices may be utilized within the DSN 400, and details of such data storage devices need not be described herein.

Still referring to FIG. 4, in embodiments, the storage server 401 includes one or more program modules (e.g., program modules 42 of FIG. 1) executed by the storage server 401 to perform one or more of the functions described herein. In implementations, the storage server 401 includes one or more of the following program modules: a task monitoring module 420, a policy module 421, a first task scheduling module 422, a second task scheduling module 423 and a rebuilder module 424.

In implementations, the task monitoring module 420 is configured to gather or receive task scheduling data from a plurality of task scheduling modules of the DSN 400 represented in FIG. 4 by the first task scheduling module 422, the second task scheduling module 423 and the rebuilder module 424. In aspects, the task monitoring module 420 is configured to monitor future scheduled task data of the DSN 400 to identify conflicting future scheduled tasks based on policies in the policy module 421, generate instructions to address the conflicting future scheduled tasks based on the policies, and send the instructions to one or more of the plurality of task scheduling modules of the DSN to update respective task schedules of the task scheduling modules.

In embodiments, the policy module 421 is configured to enable configuration and storage of task scheduling rules. In implementations, task scheduling rules include rules for prioritizing tasks or updating the order in which tasks occur, updating or replacing tasks, canceling tasks, and/or deleting tasks. In aspects, the task scheduling rules include rules for dealing with conflicts between different types of scheduled tasks, such as: 1) moving stored objects within a storage device or between storage devices in the DSN 400, deleting stored objects in the DSN 400, and rebuilding stored objects in the DSN 400. It should be understood that other rules may be stored on the policy module 421, and the invention is not limited to the examples provided herein.

In implementations, the first task scheduling module 422 is configured to generate, store and update a tasks schedule for future tasks to be implemented, such as moving, deleting, and rebuilding stored objects (e.g., Objects 1-5) in the first data storage device 402, second data storage device 403 and/or the RAID 405 of the DSN 400. Similarly, in implementations, the second task scheduling module 423 is configured to generate, store and update a tasks schedule for future tasks to be implemented, such as moving, deleting, and rebuilding stored objects (e.g., Objects 1-5) in the first data storage device 402, second data storage device 403 and/or the RAID 405 of the DSN 400.

In implementations, there exist multiple tiers of different storage medium in the DSN 400, such as storage pool of SSDs or hard drives. These different storage tiers may have different price, performance and availability characteristics. Objects stored within such a system may be migrated between tiers to satisfy customer service level agreements (SLAs), reduce cost, or improve performance characteristics of the system. These migration events may be triggered by user defined actions or via automatic decisions made with respect to different attributes of the object such as, but not limited to, age and access patterns. Objects on the DSN 400 may also be scheduled for deletion at some upcoming time via policies put in place by DSN operators. Hence, there may arise scenarios where an object is migrated between storage tiers a short time before it is scheduled to be deleted. In such a scenario, the input/output performed during object migration could have been avoided were the overall system (DSN 400) to simply wait for the scheduled object deletion to occur. In embodiments, when making such a decision regarding whether an object should or should not be migrated between tiers, the task monitoring module 420 takes into account the information regarding the upcoming scheduled deletion (expiration) of the object in order to reduce overall input/output performed on the system, thereby improving system performance and reduce operator costs.

Furthermore, in embodiments, when the task monitoring module 420 reviews a scheduled task to migrate an object that is also scheduled for expiration, the task monitoring module 420 may migrate the object to a storage tier, or a location in a storage tier, that is optimized for object deletion operations based on stored rules. In implementations, such a delete-optimized storage tier is comprised of hardware that is known to be faulty or has a high probability of being faulty, or is comprised of locations in a storage tier wherein objects that have temporary adjacent expiration times are batched together so as to improve the performance of delete operations. FIG. 4 shows the second data storage device 403 including a delete-optimized storage tier including Objects 3-5 scheduled for deletion.

Figure 5:
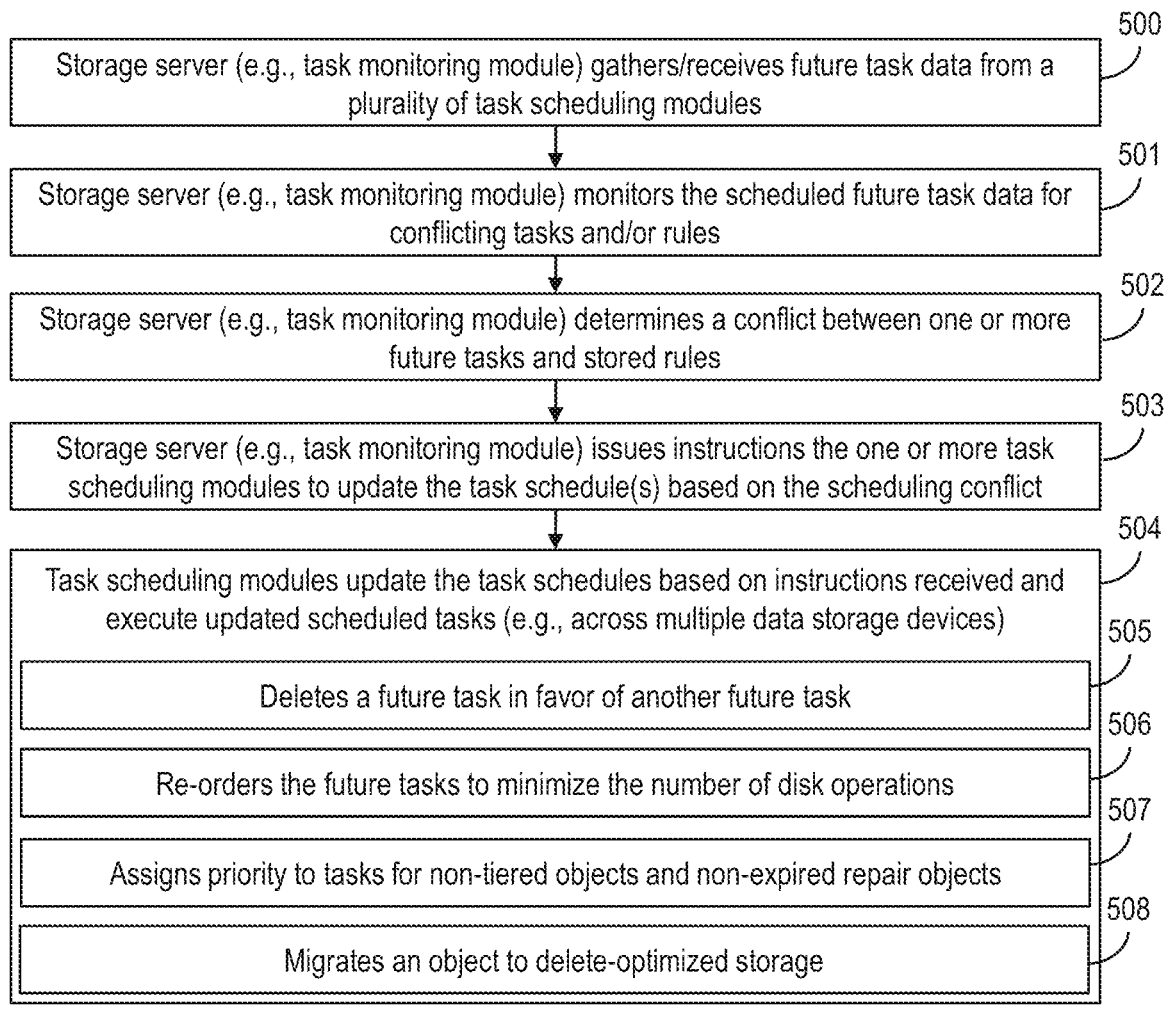
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 500, the storage server 401 gathers future task data from a plurality of task scheduling modules (e.g., the first task scheduling module 422, the second task scheduling module 423 and the rebuilder module 424) of the DSN 400. The term future task data as used herein refers to data regarding future tasks scheduled by one or more task scheduling modules of the DSN 400 regarding one or more stored objects in the DSN 400. Future task data may include, for example, data regarding scheduling a deletion of a stored object (e.g., Objects 3-5), moving a stored object within the DSN 400 (e.g., moving Object 2 from the first data storage device 402 to the second data storage device 403), or rebuilding a stored object (e.g., Object 1). In the example shown in FIG. 4, the task scheduling modules (422, 423, 424) are on the storage server 401. However, in other embodiments, the storage server 401 gathers future task data from remote task scheduling modules (not depicted) in addition to or instead of the local task scheduling modules 422, 423 and 424 depicted in FIG. 4. In embodiments, the task monitoring module 420 of the storage server 401 implements step 500.

At step 501, the storage server 401 monitors the scheduled future task data for conflicting tasks and/or rules. In implementations, the storage server 401 utilizes configurable stored rules in the policy module 421 in the monitoring of the scheduled future task data. Rules in the policy module 421 may include, for example, rules regarding the order in which scheduled tasks should occur, instances in which scheduled tasks should be deleted, instances in which scheduled tasks should be delayed, and instances in which scheduled tasks should be modified/replaced. Step 501 may be performed on a continuous or scheduled basis. In embodiments, the task monitoring module 420 of the storage server 401 implements step 501.

At step 502, the storage server 401 determines a conflict exists for one or more future tasks to be executed by one or more of the task scheduling modules of the DSN 400 (e.g., the first task scheduling module 422, the second task scheduling module 423 and the rebuilder module 424) based on the rules in the policy module 421. In embodiments, the task monitoring module 420 of the storage server 401 implements step 502.

Still referring to step 502, in one example, the storage server 401 determines that a future task to delete the Object 3 conflicts with a prior future scheduled task to move the Object 3. In this example, moving the Object 3 would require a waste of computing resources since the Object 3 would be deleted shortly thereafter. In this example, the storage server 401 accesses a rule to cancel object moving tasks when the object to be moved is also scheduled for deletion within a predetermined amount of time of the scheduled move, and recognizes a conflict based on this rule.

In a second example, the storage server 401 recognizes a conflict exists when a scheduled task to repair the Object 1 by the rebuilder module 424 occurs prior to a scheduled task to delete the Object 1. In this example, the storage server 401 accesses a rule to cancel object repairing tasks when the object to be repaired is also scheduled for deletion within a predetermined amount of time of the scheduled repair, and recognizes a conflict based on this rule.

In a third example, the storage server 401 determines that a future task to repair an object in the RAID 405 conflicts with a later future scheduled task to move the object between tiers 418a and 418b in the RAID 405. In this example, repairing the object would require a waste of computing resources since the object would be restored to health in the process of re-writing (migrating) the object from tier 418a to 418b within the RAID 405. In this example, the storage server 401 accesses a rule to cancel object repairing tasks when the object to be repaired is also scheduled for re-writing to another storage tier within a predetermined amount of time of the scheduled repair, and recognizes a conflict based on this rule.

In a fourth example, the storage server 401 determines that a future task to delete the Object 2 from the first data storage device 402 conflicts with stored rules indicating that objects should be migrated to the deletion-optimized second data storage device 403 prior to deletion. In this example, a stored rule may indicate that scheduled tasks to delete objects on the first data storage device 402 should be replaced with a scheduled tasks to move the object to the second data storage device 403.

At step 503, the storage server 401 prepares and issues instructions to one or more of the task scheduling modules of the DSN 400 (e.g., 422, 423 and 424) to update their respective task schedule(s) based on the determined conflict of step 502. In implementations, the instructions are prepared based on the stored rules in the policy module 421. In aspects, the instructions may be selected from a plurality of preconfigured instructions based on the rules. In embodiments, the task monitoring module 420 of the storage server 401 implements step 503.

At step 504, one or more of the task scheduling modules of the DSN 400 (e.g., 422, 423 and 424) update their respective task schedule(s) based on receiving the instructions of step 503, and execute the updated scheduled tasks in due course. In embodiments, the updated task schedules encompass tasks to be performed across multiple data storage devices (e.g., 402, 403 and 405) of the DSN 400. The updating to be performed by the data storage devices of the DSN 400 may include, for example, deleting a future scheduled task in favor of another future task (505), re-ordering one or more future tasks to minimize a number of disk operations to be performed within the DSN 400 (506), assigning priority to tasks for non-tiered objects and non-expired objects to be repaired (507), and migrating one or more objects to a delete-optimized data storage device (e.g., second data storage device 403) (508).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
gathering, by a computing device, scheduled future task data for scheduled future tasks from a plurality of task scheduling modules within a dispersed storage network, wherein the scheduled future tasks are tasks associated with stored data objects;
monitoring, by the computing device, the scheduled future task data for conflicts between the scheduled future tasks based on stored rules;
determining, by the computing device and based on the monitoring, that a conflict exists between a first future task of the scheduled future tasks and a second future task of the scheduled future tasks, wherein the conflict comprises one of the first future task and the second future task rendering the other of the first future task and the second future task unnecessary or causing redundancies in work performed by the dispersed storage network;

issuing instructions, by the computing device, to update the first future task or the second future task based on the conflict; and updating, by the at least one of the plurality of task scheduling modules, the first future task based on the instructions thereby creating updated scheduled future tasks, wherein at least one of the updated scheduled future tasks are performed in the dispersed storage network and the performance of the at least one of the updated scheduled future tasks requires less computational resources than performance of the scheduled future tasks, wherein the first future task comprises repairing one of the stored data objects at a first storage module, the second future task comprises moving the one of the stored data objects from the first storage module to a second storage module, the instructions comprise instructions to cancel the first future task, and the second future task is performed in response to execution of the instructions.

2. The computer-implemented method of claim 1, wherein the scheduled future tasks further comprise a third task of repairing a second one of the stored data objects and a fourth task of deleting the second one of the stored data objects, and wherein the method further comprises issuing a second set of instructions to cancel the third task in response to determining that a second conflict exists between the third task and the fourth task.

3. The computer-implemented method of claim 1, wherein one of the plurality of task scheduling modules comprises a rebuilding module configured to repair a selected object of the stored data objects dispersed among a plurality of storage modules as slices of the selected object.

4. The computer-implemented method of claim 1, wherein a service provider at least one of creates, maintains, deploys and supports the computing device.

5. The computer-implemented method of claim 1, wherein the monitoring, determining and issuing are provided by a service provider on a subscription, advertising, and/or fee basis.

6. The computer-implemented method of claim 1, wherein the computing device includes software provided as a service in a cloud environment.

7. A computer program product, the computer program product comprising a computer readable storage medium having program instructions embodied therewith, the program instructions executable by a computing device to cause the computing device to:

gather scheduled future task data for scheduled future tasks from a plurality of task scheduling modules in a dispersed storage network, wherein the scheduled future tasks are tasks associated with stored data objects in the dispersed storage network;

monitor the scheduled future tasks for conflicts;

determine, based on the monitoring, a conflict exists between a first future task and a second future task of the scheduled future tasks; and issue instructions to update the first future task or the second future task based on the conflict, wherein:

the first future task comprises repairing a selected data object of the stored data objects at a first storage module and the second future task comprises moving the selected data object from the first storage module to a second storage module;

the instructions comprise instructions to cancel the first future task; and the program instructions are further executable to perform the second future task in response to execution of the instructions.

8. The computer program product of claim 7, wherein the program instructions are further executable to:

determine, based on the monitoring, a second conflict exists between a third future task and a fourth future task; and issue instructions to update the third future task or the fourth future task based on the second conflict;

wherein the updating the third future task or the fourth future task is selected from the group consisting of: cancelling the third future task; changing an order in which the third task and fourth future task are to be executed to minimize a number of operations of the computing device; and prioritizing the third future task over the fourth future task when the third future task is repairing a second selected data object of the stored data objects that is not scheduled to be tiered or expired.

9. The computer program product of claim 7, wherein the program instructions are further executable to:

determine, based on the monitoring, a second conflict exists between a third future task and a fourth future task; and issue instructions based on the second conflict;

wherein the third future task comprises repairing a second selected data object of the stored data objects and the fourth future task comprises deleting the second selected data object, and wherein the program instructions are further executable to cancel the third future task.

10. The computer-implemented method of claim 7, wherein one of the plurality of task scheduling modules comprises a rebuilding module configured to repair the selected data object of the stored data objects dispersed among a plurality of storage modules as slices of the selected data object.

11. The computer program product of claim 8, wherein the second conflict comprises one of the third future task and the fourth future task rendering the other of the third future task and the fourth future task unnecessary or causing redundancies in work performed by the dispersed storage network.

12. A system comprising:

a processor, a computer readable memory, and a computer readable storage medium associated with a computing device;

program instructions to monitor scheduled future task data for scheduled future tasks within a dispersed storage network for conflicts based on stored rules, wherein the scheduled future tasks are tasks associated with stored data objects;

program instructions to determine, based on the monitoring, that a conflict exists with respect to a first future task of the scheduled future tasks based on the stored rules;

program instructions to issue instructions to update the first future task based on the conflict, wherein:

the first future task comprises repairing a selected data object of the stored data objects at a first storage module, the second future task comprises moving the selected data object from the first storage module to a second storage module, the instructions comprise instructions to cancel the first future task, and the program instructions are stored on the computer readable storage medium for execution by the processor via the computer readable memory; and program instructions are further executable to perform the second future task in response to execution of the instructions.

13. The system of claim 12, further comprising program instructions to receive the scheduled future tasks from a plurality of task scheduling modules in the dispersed storage network.

14. The system of claim 12, further comprising:
program instructions to determine, based on the monitoring, a second conflict exists between a third future task and another future task; and
program instructions to issue instructions to update the third future task based on the second conflict;
wherein the updating the third future task is selected from the group consisting of: cancelling the third future task; change an order in which the third future task and the other future task are to be executed to minimize a number of operations of the computing device; and prioritize the third future task over the other future task when the third future task is repairing a another selected data object of the stored data objects that is not scheduled to be moved or deleted.

15. The system of claim 12, further comprising:
program instructions to determine, based on the monitoring, a second conflict exists between a third future task and another future task; and
program instructions to issue instructions based on the second conflict;
wherein the third future task comprises repairing one of the stored data objects and the other future task comprises deleting the one of the stored data objects, and wherein the program instructions are further executable to cancel the third future task.

16. The system of claim 12, wherein the system further comprises a rebuilding module configured to repair a data object of the stored data objects dispersed among a plurality of storage modules as slices of the data object.

17. The system of claim 14, wherein the second conflict comprises one of the third future task and the other future task rendering the other of the third future task and the other future task unnecessary or causing redundancies in work performed by the dispersed storage network.

* * * * *